United States Patent [19]

Papineau

[11] 4,010,541
[45] Mar. 8, 1977

[54] CITRUS FRUIT PEELING IMPLEMENT

[76] Inventor: Jean Guy Papineau, 2306 Charles Road, Hallandale, Fla. 33009

[22] Filed: Jan. 15, 1976

[21] Appl. No.: 649,243

[52] U.S. Cl. .............................. 30/123.7; 30/113.3
[51] Int. Cl.$^2$ ........................................ A47J 17/04
[58] Field of Search ........... 30/123.5, 123.7, 113.1, 30/113.3

[56] References Cited

UNITED STATES PATENTS

| | | | |
|---|---|---|---|
| 1,472,462 | 10/1923 | DePort | 30/123.7 |
| 1,794,800 | 3/1931 | Smith | 30/113.3 |
| 2,546,032 | 3/1951 | Holmberg | 30/123.5 |
| 3,237,299 | 3/1966 | Gibbs | 30/123.7 |

FOREIGN PATENTS OR APPLICATIONS 1,255,669  12/1971  United Kingdom ............. 30/123.7

*Primary Examiner*—Al Lawrence Smith
*Assistant Examiner*—J. C. Peters
*Attorney, Agent, or Firm*—Ernest H. Schmidt

[57] ABSTRACT

An elongated, substantially flat implement is integrally formed with a tubular coring portion at one end for removing core portions of a peeled citrus fruit, one or more cutting edges extending outwardly of one side of the implement at a central position therealong for peripherally scoring the rind of citrus fruit, and a rounded tip portion at the other end for insertion under the scored rind for wedging and prying the rind halves from citrus fruit before coring.

3 Claims, 6 Drawing Figures

U.S. Patent   Mar. 8, 1977   4,010,541
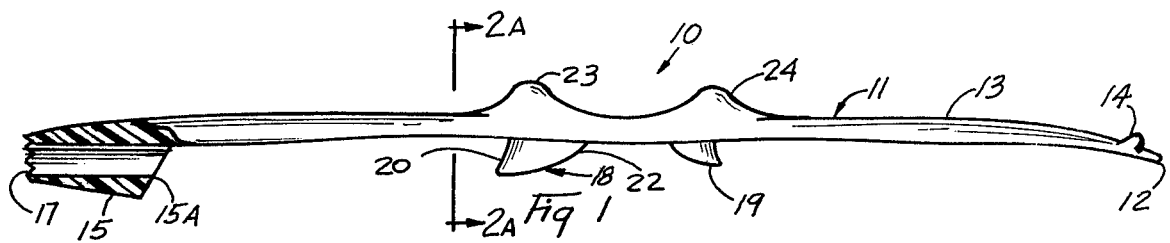
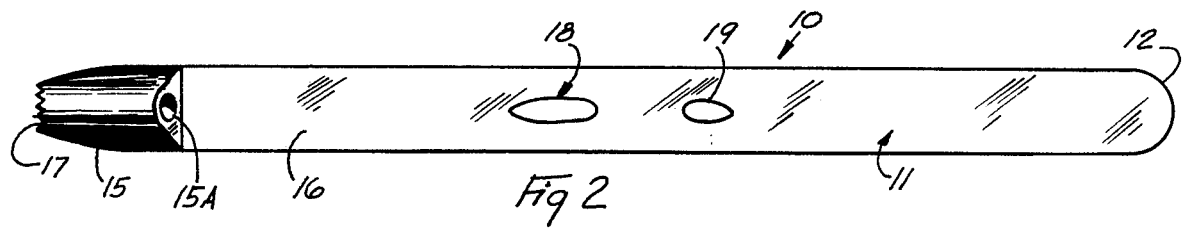
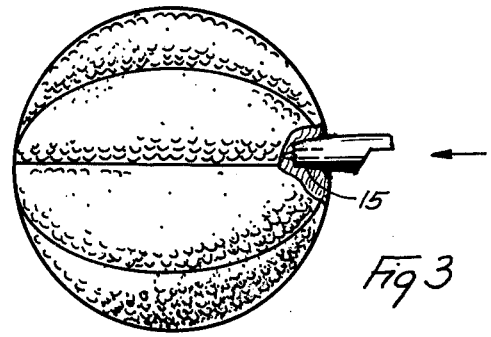
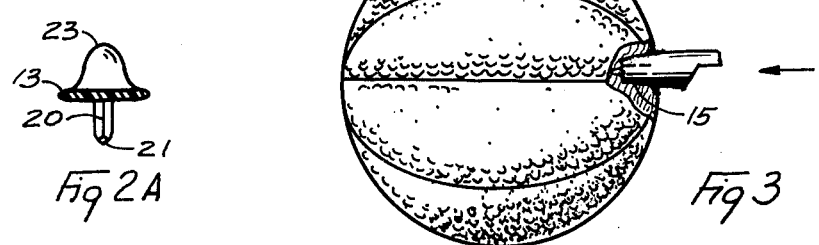
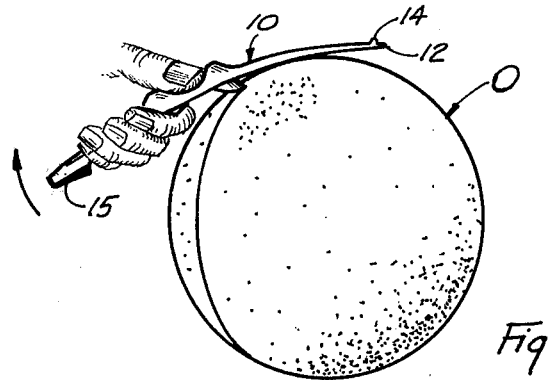
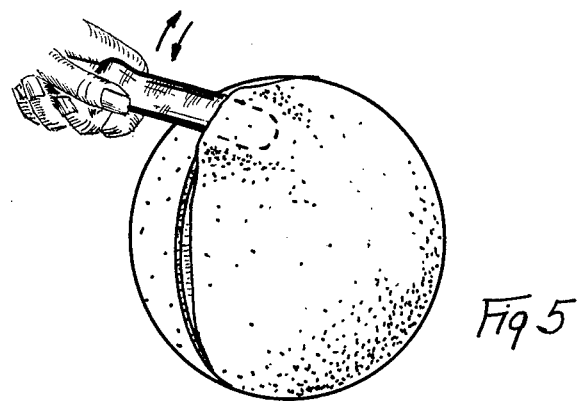

CITRUS FRUIT PEELING IMPLEMENT

This invention relates to fruit peeling tools or implements and is directed particularly to a novel and improved implement for peeling the rind from citrus fruit such as oranges and grapefruit.

The principal object of this invention is to provide a unitary citrus fruit peeling implement which serves to cut or score the fruit about its equatorial periphery, separate both halves of the scored rind from the fruit meat or sections with a minimum of effort, and thereafter core the fruit to facilitate separation of the fruit sections.

A more particular object of the invention is to provide a unitary fruit peeling implement of the above nature including means for making either shallow or deep scoring cuts, selectively, depending upon the thickness of the fruit rind to be removed.

Still another object of the invention is to provide a fruit peeling implement of the above nature which can readily be integrally fabricated of a tough synthetic material by the use of injection molding techniques.

Yet another object of the invention is to provide a citrus fruit peeling implement which will be simple in construction, inexpensive to manufacture, effective in operation and long wearing in use.

Yet other objects, features and advantages of the invention will be apparent from the following description when read with reference to the accompanying drawings. In the drawings, wherein like reference numerals denote corresponding parts throughout the several views:

FIG. 1 is a side elevational view of a citrus fruit peeling implement embodying the invention;

FIG. 2 is bottom view thereof;

FIG. 2a is a vertical cross-sectional view taken along the line 2a–2a of FIG. 1, in the direction of the arrows;

FIG. 3 is a side elevational view of the coring end portion of the peeling implement illustrating its use in coring an orange or other citrus fruit, after the skin or rind has been removed;

FIG. 4 illustrates use of the peeling implement in scoring the rind of the fruit about the equatorial diameter; and FIG. 5 illustrates use of the tool in separating or peeling the scored rind halves away from the body or meat of the fruit.

Referring now in detail to the drawings, reference numeral 10 designates, generally, a preferred form of citrus fruit peeling implement embodying the invention, the same being integrally formed of a tough synthetic plastic material. As illustrated in FIGS. 1 and 2 the peeling implement 10 comprises an elongated, substantially flat body portion 11, one end of which is rounded as indicated at 12. The upper surface 13 of the body portion 11, near the rounded end, is formed with a laterally-extending, rounded protrusion 14, as best illustrated in FIG. 1. The other end of the body portion 11 is integrally formed with a substantially conical coring portion 15 merging with and extending outwardly of said outer end of said body portion from the under-surface 16 thereof. The inner end of the conical coring portion 15 defines an obtuse angle with the under-surface 16 of the implement body portion 11, and the outer end is peripherally serrated to define shallow, peripheral teeth 17.

The under-surface 16 also has integrally formed therewith, centrally disposed therealong, a pair of spaced rind cutting members 18,19, of substantially identical shape but different in size to provide for the cutting, selectively, of citrus fruit rinds of different thickness. The cutting member 18, as best illustrated in FIGS. 1, 2 and 2a, has a slightly concave rearwardly-directed cutting edge 20 which merges with a blunt tip 21. From the tip 21, the cutting member 18 extends into a convexly-curved outer surface 22 which converges to the under-surface 16. As best illustrated in FIG. 2, the lateral thickness of the cutting member 18 is about ¼ the width of the implement body portion 11, and is rounded at each end. The cutting member 19 is similar in shape to that of the cutting member 18, differing only in that it is of smaller size and has its cutting edge directed to the rounded end 12 of the body portion 11. As best illustrated in FIG. 1, the upper surface 13 of the implement is integrally formed with a pair of rounded protrusion 23,24 opposite respective cutting members 18,19, which serve as thumb stops in the manipulation of the device in use, as is hereinafter described.

Considering now the operation of the citrus fruit peeling implement, the first step in the peeling sequence, as illustrated in FIG. 4, is to score the fruit about it equatorial periphery by use of one or the other of the cutting members 18 or 19 as a cutting knife, depending upon the thickness of the rind of the fruit being cut. In this connection it is to be note that the blunt tip 20 of the cutting edge minimizes the possibility of cutting through the skin of the citrus fruit segments. After scoring or peripheral cutting of the rind, the rounded end 12 of the body portion 11 will be inserted under the rind, with the protrusion 14 directed outwardly, as illustrated in FIG. 5, and the implement will be moved back and forth around the fruit, while at the same time pushing inwardly, until that half of the rind is separated from the fruit. This operation will be repeated to similarly remove the remaining half of the scored rind. In this connection it is to be noted that the laterally-extending rounded protrusion 14 aids in separating the rind from the fruit segments because of its wedge-like action in lifting and separating the rind from the fruit meat.

Referring now to FIG. 3, it can be seen how the core ends of an orange O, for example, can be cut away simply by pushing and turning the tubular coring portion 15 of the implement into the core end of the peeled fruit. The core portion to be removed will be forced through the central opening 15a of the coring portion 15 to pass through its open inner end with repeated use or upon cleaning the implement. In this connection it will be noted that the conical shape of the coring portion 15 serves to spread the fruit segment ends apart to facilitate manual separation of the segments.

While I have illustrated and described herein only one form in which my invention can conveniently be embodied in practice, it is to be understood that this embodiment is presented by way of example only and not in a limiting sense. My invention, in brief, comprises all the embodiments and modifications coming within the scope and spirit of the following claims.

I claim:

1. A citrus fruit peeling implement comprising, in combination, an elongated body member, cutting means extending outwardly of one side of said body member intermediate the ends thereof for scoring, about its periphery, the rind of a citrus fruit to be peeled, said cutting means comprising a cutting edge directed to an end portion of said body member, said cutting edge terminating in a blunt tip to minimize the possibility of cutting into the fruit meat of the citrus fruit being scored, one end of said body member being substantially flat, and being terminally rounded to facilitate its wedge-like insertion beneath the rind at a scored cut for prying the rind from the fruit, and a second cutting means substantially identical with said first mentioned cutting means, spaced from said first cutting means and intermediate the ends of said body member, said second cutting means extending to a lesser distance outwardly of said one side of said body member and being directed to the end thereof opposite the direction of said first cutting means, said first and second cutting means being for selective use depending on the thickness of the citrus rind to be scored.

2. A citrus fruit peeling implement as defined in claim 1, including a rounded protrusion extending outwardly of the other side of said body member opposite each of said cutting means to serve as thumb stops in the selective manipulation of the implement during use in rind scoring operations.

3. A citrus fruit peeling implement as defined in claim 2, wherein said implement is integrally formed of a tough synthetic plastic material.

* * * * *